United States Patent [19]

Coussot et al.

[11] 4,361,050
[45] Nov. 30, 1982

[54] DEVICE FOR MEASURING THE FLOW RATE OF A FLUID AND AIR FLOW SENSOR SYSTEM IN AN INTERNAL COMBUSTION ENGINE UTILIZING SUCH A DEVICE

[75] Inventors: Gérard Coussot; Pierre Hartemann, both of Paris, France

[73] Assignee: Thomson-CSF, Paris, France

[21] Appl. No.: 195,623

[22] Filed: Oct. 9, 1980

[30] Foreign Application Priority Data

Oct. 12, 1979 [FR] France .................. 79 25467

[51] Int. Cl.³ .............................. G01F 1/38
[52] U.S. Cl. ...................... 73/861.47; 73/861.61; 73/DIG. 4
[58] Field of Search .......... 73/861.47, 861.48, 861.52, 73/861.61, 703, 715, DIG. 4; 310/313 B

[56] References Cited

U.S. PATENT DOCUMENTS

| 1,298,471 | 3/1919 | Dodge | 73/861.61 |
| 1,904,333 | 4/1933 | Smith, Jr. | 73/861.61 |
| 2,734,526 | 4/1956 | Aagaard | |
| 2,942,465 | 6/1960 | Carbone | 73/861.61 |
| 3,521,487 | 7/1970 | Akeley | 73/861.61 |
| 3,978,731 | 9/1976 | Reeder et al. | 73/703 |
| 4,100,811 | 7/1978 | Cullen et al. | |

FOREIGN PATENT DOCUMENTS 332116 9/1929 United Kingdom .
779363 7/1957 United Kingdom .

OTHER PUBLICATIONS

Proceedings of the IEEE, vol. 64, No. 5, May 1976, T. M. Reeder et al., "Surface-Acoustic-Wave Pressure & Temperature Sensors", pp. 754-756.

Primary Examiner—Herbert Goldstein
Attorney, Agent, or Firm—Oblon, Fisher, Spivak, McClelland & Maier

[57] ABSTRACT

A flowmeter incorporating a pressure differential member creating a differential pressure between an upstream flow path and a downstream flow path of a pipe. The flowmeter has pressure connecting lines located on either side of the pressure differential member and constituted by conduits issuing on the surface of the device. The pressures in the upstream and downstream flow paths are transferred to a differential pressure sensor constituted by two elastic surface wave oscillators supplying signals, whose frequency is proportional to the pressures. The signals are then transmitted to a mixer, whose output supplies a beat signal, whose frequency is equal to the difference of the frequencies of the signal supplied by the oscillators. This frequency difference is directly proportional to the differential pressure.

9 Claims, 11 Drawing Figures

DEVICE FOR MEASURING THE FLOW RATE OF A FLUID AND AIR FLOW SENSOR SYSTEM IN AN INTERNAL COMBUSTION ENGINE UTILIZING SUCH A DEVICE

BACKGROUND OF THE INVENTION

Field of the Invention

The present invention relates to a device for measuring the flow rate of a fluid circulating in pipes.

The so-called "voludeprimometer" method is the most commonly used for measuring the instantaneous flow rate of a fluid, liquid or gas. For this purpose, a flow measuring device, called hereinafter a flowmeter, is inserted into the pipe where the fluid is circulating. This type of flowmeter includes a member which creates a differential pressure between the upstream flow path of the pipe and the downstream flow path. This member is usually, for example, of the diaphragm or nozzle type having a metering hole traversed by the fluid and thus creating the differential pressure. Pressure inlets constituted by pipes issuing on either side of the pressure differential member transmit the pressures in the upstream circuit and downstream circuit to a suitable pick-off or sensor, e.g. of the mechanical or electromechanical type.

Pressure differential members are static elements of simple construction, which are therefore generally inexpensive and easy to modify. They are used under very high pressures. However, the equation linking the differential pressure with the flow rate is of the form $Q = k\sqrt{\Delta P}$ in which Q is the volume flow rate, k a parameter dependent on the measuring conditions and the dimensional characteristics of the pressure differential member and $\Delta P$ the differential pressure in the upstream circuit and the downstream circuit. Thus, the flowmeter must be equipped with a mechanism able to linearize this function. If the flowmeter is used as a simple measuring apparatus, these mechanisms can be reduced to their most simple expression by giving the measuring apparatus a quadratic reading scale. However, the accuracy at the bottom of the range is low. However, if the flowmeter is used as a control device, for example incorporated into a control chain, more elaborate linearization devices must be provided. They can be mechanical devices, e.g. cams shaped according to a law of the second degree or electrical members, e.g. potentiometers or similar components, whose resistance varies according to the same law.

It is in fact desirable to be able to obtain a measuring signal which is directly proportional to the flow rate. On the one hand, a flow indicator can be graduated in a regular manner and on the other this obviates the introduction of a non-linearity which can have an unfavourable influence on the dynamic behaviour of a control loop. Finally, these mechanical or electromechanical conversion members incorporate moving parts which are relatively unreliable, cumbersome and have a slow response.

One of the interesting applications of such a flowmeter is the measurement of the quantity of air admitted into the cylinders of an internal combustion engine. The knowledge of this parameter is necessary for the construction of certain types of regulation systems used for fuel injection purposes. The tendency at present is to use systems of the digital type using, for example, a central processing unit for the data corresponding to the different parameters measured and constituted by a microprocessor. It is therefore of interest to use sensors supplying digital signals. In addition, the linearization of signals involving a quadratic law is facilitated. This linearization can either be carried out by a cabled device generally using pulse counters, or by the actual processor by means of a suitable program.

BRIEF SUMMARY OF THE INVENTION

Therefore, the invention relates to a flowmeter of the aforementioned type using as the pressure sensor at least two pressure - frequency transducers with elastic surface waves and exposed respectively to the pressure in the upstream circuit and in the downstream circuit. These two oscillators supply signals with a first and a second frequency which, after mixing, are converted into a signal of a third frequency or beat frequency representing the differential pressure.

The present invention therefore relates to a device for measuring the flow rate of a fluid which is to be inserted in a pipe in which circulates the fluid and to create there an upstream and a downstream circuit or flow path, the device including a body and a member creating a differential pressure between the upstream and downstream circuits, the member also being integral with the body and the latter being traversed by a communication channel permitting the circulation of the fluid between the upstream and downstream circuits, the channel being provided with first and second pressure intakes constituted by conduits located on either side of the member, the device including a pressure sensor with a first and a second elastic surface wave oscillator, each constituted by an amplifier and a delay line with electromechanical split-finger transducers positioned on a piezoelectric plate common to both the oscillators, the plate being rigidly fixed to the body and the electromechanical transducers being positioned on one of the faces of the plate in first and second zones exposed respectively, on the face opposite to the face carrying the electrical mechanical transducers, to pressures occurring in the conduits constituting the first and second pressure intakes, so as to modify the propagation time of the elastic surface waves in the associated delay line and make the frequency of the electrical signal supplied by the first and second oscillators dependent on the pressures, the sensor also being provided with a mixer circuit receiving these signals and supplying at its output a beat signal, whose frequency is equal to the difference between the first and second frequencies.

The invention also relates to a system for sensing the flow rate of the air admitted into the cylinders of an internal combustion engine incorporating such a device.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Reference is firstly made to certain essential points for understanding the phenomena involved during the flow of fluids in pipes and to the way in which it is possible to deduce therefrom methods for measuring the flow rates of said fluids. On considering a perfect incompressible fluid flowing in a horizontal pipe of constant cross-section S having smooth walls, the pressure P within the fluid is also contant. However, if the pipe remains horizontal, but its cross-section is variable, it is known that the fluid pressure P is lower at the points where the cross-section S is smaller and correlatively the velocity V of the fluid equal to (Q/S) is greater, Q being the volume flow of the fluid. The above results are not completely true for real fluids. Inter alia, the flow can only be maintained by a pressure difference able to produce work which is dissipated as heat by friction. Thus, the equations describing the fluid flow in the conduits must also take account of the nature of the fluid and in particular its viscosity coefficient and its specific gravity. Thus, under true conditions, there is a pressure difference between two points separated by a distance 1 in one and the same pipe in which flows a fluid. This pressure difference is called the loss of pressure head and it is possible to define a parameter $$\omega = \frac{p - p'}{1}$$

representing the linear loss of pressurehead in which p and p' are the pressures occurring at two points in a pipe spaced by the distance 1.

On the basis of these results, the device according to the invention can be constructed in accordance with two embodiments.

Figure 1:
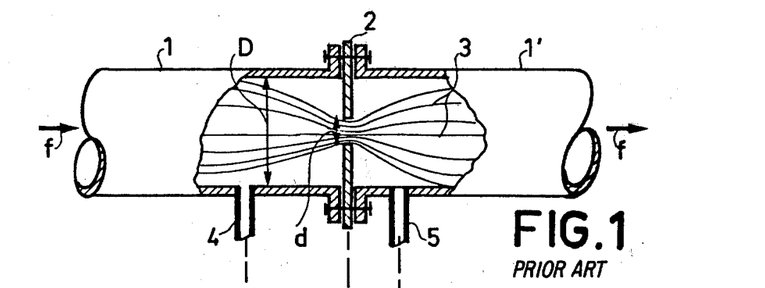
FIGS. 1 and 2 the operation of a pressure differential member used in the flowmeter of the "voludeprimometer" type.

According to the first embodiment diagrammatically illustrated by FIG. 1, a pressure differential member 2 is introduced into the fluid flow path and in the case of FIG. 1 is constituted by a diaphragm having a hole with a diameter d. The fluid circulating in the direction of arrows f flows in the conduit in accordance with the flow line symbolized by the lines 3. In the circuit upstream of the pipe, assumed to have a circular cross-section and an internal diameter D, the fluid has a pressure equal to $P_1$. In the immediate vicinity of the pressure differential member 2, the pressure of the fluid varies in accordance with the curve shown in FIG. 2. In the downstream circuit 1', the pressure of the fluid is $P_3$. There is an instantaneous decrease in the pressure, which drops to the value $P_2$ at the outlet from the pressure differential member 2. The value $\Delta P$, i.e. the difference of pressure $P_1 - P_2$ is called the differential pressure. A large part of the differential pressure is recovered downstream of the pressure differential member and the residual loss of pressure head is called $\Delta P_r$, equal to $P_1 - P_3$. This value is dependent on the nature of the pressure differential member used and is approximately 40% for diaphragms and 10% for nozzles. Such a pressure differential member will be described hereinafter with reference to FIG. 6.

It is known that the flow of a fluid in a pipe can take place in laminar manner or under Poiseuille conditions on the one hand and in turbulent manner or according to Venturi conditions on the other. The flow condition is mainly dependent on the flow velocity, the cross-section of the pipe and the nature of the fluid. When all the other conditions are left unchanged, the change from laminar conditions to turbulent conditions takes place through increasing the fluid flow rate. Flowmeters using a pressure differential member are employed under turbulent conditions and in this case, as indicated hereinbefore, the law linking the differential pressure and the flow rate is given by the formula $Q = k\sqrt{\Delta P}$. The parameter k is determined in each case by, on the one hand, the conditions or measurement, i.e. temperature, pressure and nature of the fluid and, on the other hand, by the dimensional characteristics and the pressure differential member.

Generally, it is very difficult to determine the fluid flow phenomena by mathematical calculations only. Standards and, for example, French standard NFX10-102 define empirical calculation methods for pressure differential devices guaranteeing a precision of the order of 1 to 3%. Inter alia, these standards define the diameter d of the diaphragm hole, as well as the precise locations where the pressures $P_1$ and $P_3$ are to be measured. For this purpose, pressure intakes constituted by conduits 4 and 5 are positioned on either side of the pressure differential member 2.

Figure 2:
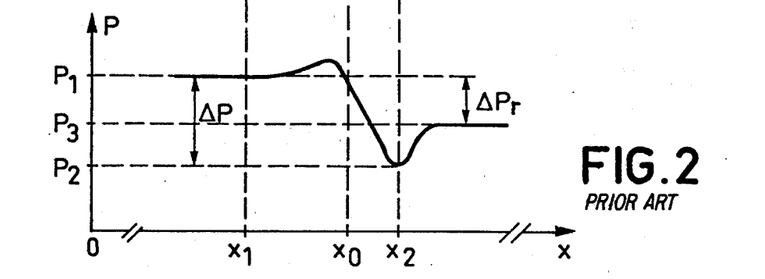

In FIG. 2, the abscissa of the diaphragm 2 being $x_0$, the pressure intakes are located at the respective abscissas $x_1$ and $x_2$. For a single diaphragm, the distance $x_1 x_0$ is approximately of value D and distance $x_0 x_2$ is approximately (D/2).

As stated hereinbefore, flowmeters utilizing pressure differential members (like the diaphragms illustrated in FIG. 1) are associated with a pressure sensor making it possible to measure the differential pressure $\Delta P$. The prior art sensors are generally analog mechanical or electromechanical sensors. It is then difficult to calculate the square root of the value obtained, the law linking the differential pressure with the flow rate being a quadratic law. The invention proposes the use of an elastic surface wave oscillator as the pressure sensor.

Figure 3:
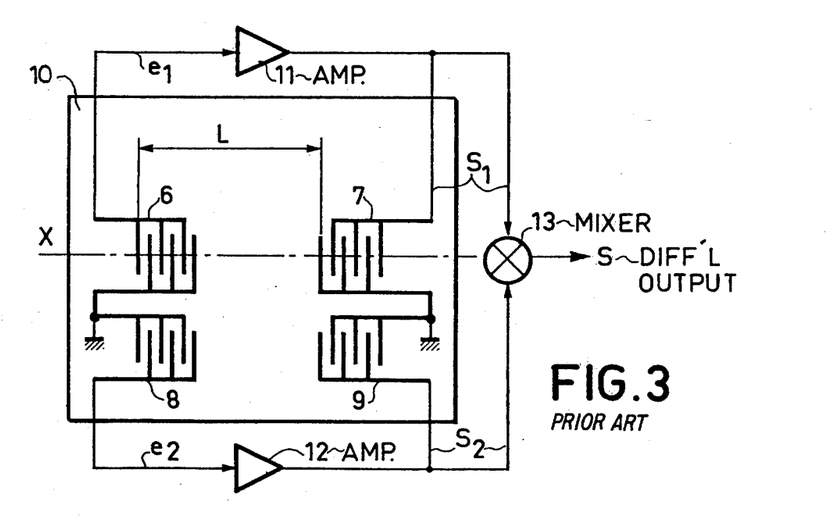
FIG. 3 an elastic surface wave oscillator.

The elastic surface wave pressure sensors are known. Pressure sensors utilizing a single elastic surface wave oscillator were originally proposed. More recently, a sensor utilizing two oscillators, whose output frequencies are mixed has been proposed in order to compensate for parasitic effects. FIG. 3 illustrates such a sensor. A first oscillator is constituted by a delay line incorporating two pairs of electrodes in the form of split-finger transducers 6 and 7 deposited on a piezoelectric material plate and connected respectively to the input $e_1$ and to the output $S_1$ of an electrical signal amplifier 11. Two like elements of these transducers are separated by a distance L. A second oscillator has two pairs of electrodes in the form of split-finger transducers 8 and 9, connected respectively to the input $e_2$ and to the output $S_2$ of an amplifier 12. The two oscillators respectively produce a signal of a first frequency $f_1$ and a second frequency $f_2$. The two signals present at the outputs $S_1$ and $S_2$ are mixed in a mixer circuit 13 producing a signal at its output S of frequency $\Delta f$ equal to the difference in the frequencies of the two oscillators. This frequency $\Delta f$ is called the beat frequency. A device of this type is described, for example, in U.S. Pat. No. 4,100,811.

As shown in FIG. 3, the delay line incorporating transducers 6 and 7 is located on the central part of the piezoelectric plate 10 and is exposed to a pressure to be measured on the face opposite to the deposited electrodes. The axis of this delay line is indicated by the interrupted line X. The second delay line incorporating transducers 8 and 9 is positioned peripherally. This arrangement makes it possible to compensate to a considerable extent the effect of thermal drift, the latter leading to frequency variations of the same sign in two oscillators.

The present invention takes advantage of a second channel on the sensors utilizing elastic surface wave oscillators. The two channels can be symmetrical to the piezoelectric plate without any disadvantages resulting from this. One of these channels is exposed to the pressure in the upstream circuit or flow path by the pressure intake 4 and the second channel exposed to the pressure in the downstream circuit or flow path by pressure intake 5. The output signals of the associated oscillators, of respective frequencies $f_1$ and $f_2$ are mixed and the beat frequency $\Delta f$ is directly proportional to the differential pressure $\Delta P$.

In the case of the measurement of the gas flow rate and for example the air flow rate, it is necessary to use pipes having a relatively large internal diameter, for example approximately 40 mm. In accordance with what has been stated hereinbefore the use of a single diaphragm like that illustrated in FIG. 1 would lead to a distance between two pressure intakes 4 and 5 of approximately 60 mm. It is more advantageous for this purpose to use a diaphragm having a so-called annular chamber, which makes it possible to reduce this distance. For this purpose, two circular cavities are made in the wall of the pipe on either side of the diaphragm open on the one hand onto respectively the upstream flow path and the downstream flow path and on the other hand via conduits 4 and 5 to the outside of the pipe.

Figure 4:
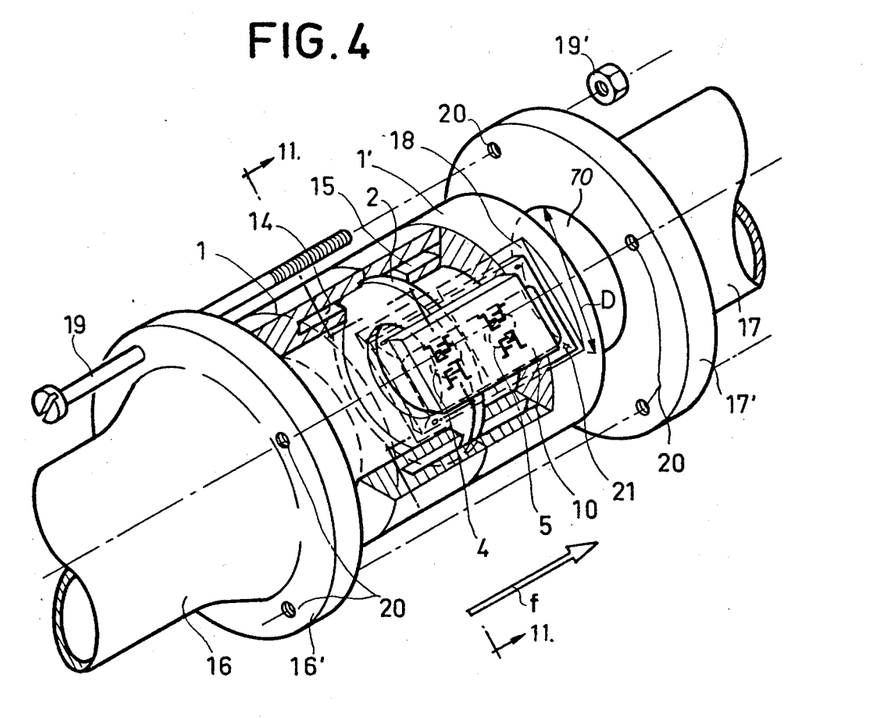
FIGS. 4 and 5 a first embodiment of a flow measuring device according to the invention, using a diaphragm as the pressure differential member.
Figure 11:
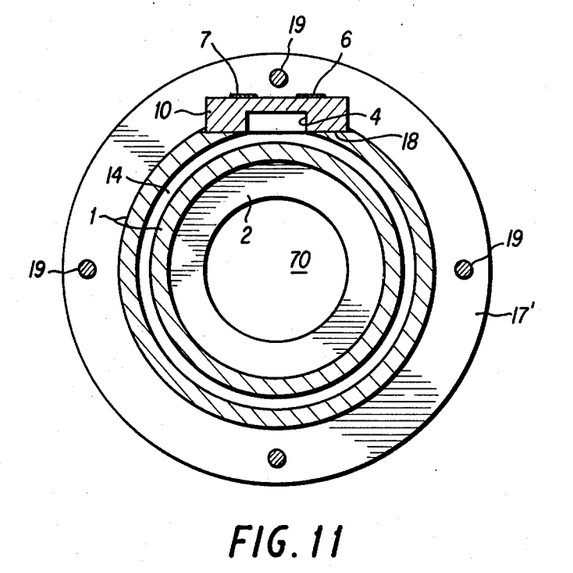
FIG. 11 is a sectional view of FIG. 4 taken along line 11—11.

A flow measuring device or flowmeter in accordance with the first embodiment of the invention and utilizing a pressure differential member of the annular chamber diaphragm type is illustrated in FIG. 4 and as further depicted in cross section in FIG. 11. This flowmeter is inserted into the pipe carrying the fluid whose rate of flow is to be measured. The flow direction is indicated by arrow f. The flowmeter body has two parts 1 enveloping the pressure differential member 2 constituted by a diaphragm with a metering hole. The flowmeter body is provided with a communication flow channel 70 of internal diameter D, preferably equal to that of the pipe in which the fluid flows. This flowmeter is held between the upstream circuit 16 and the downstream circuit 17. For this purpose, the circuits are, for example, provided with flanges 16' and 17' secured by fixing means 19, 19' and 20. On either side of diaphragm 2 there are circular ducts 14 and 15 communicating on the one hand with the fluid and on the other, via conduits 4 and 5, with a pressure sensor according to the invention and which will be described relative to FIG. 5. Part of the flowmeter body has been cut away to show the hidden parts thereof. In addition, a flat surface portion 18 has been provided on part of the outer surface of the flowmeter body to permit the fixing of plate 10 thereto as clearly shown in FIG. 11 and, which is an essential element of the sensor according to the invention. A protective cap 21 can be provided and fixed to the flat surface portion. In particular, it makes it possible to protect the piezoelectric plate carrying the transducers against the action of external agents.

Figure 5:
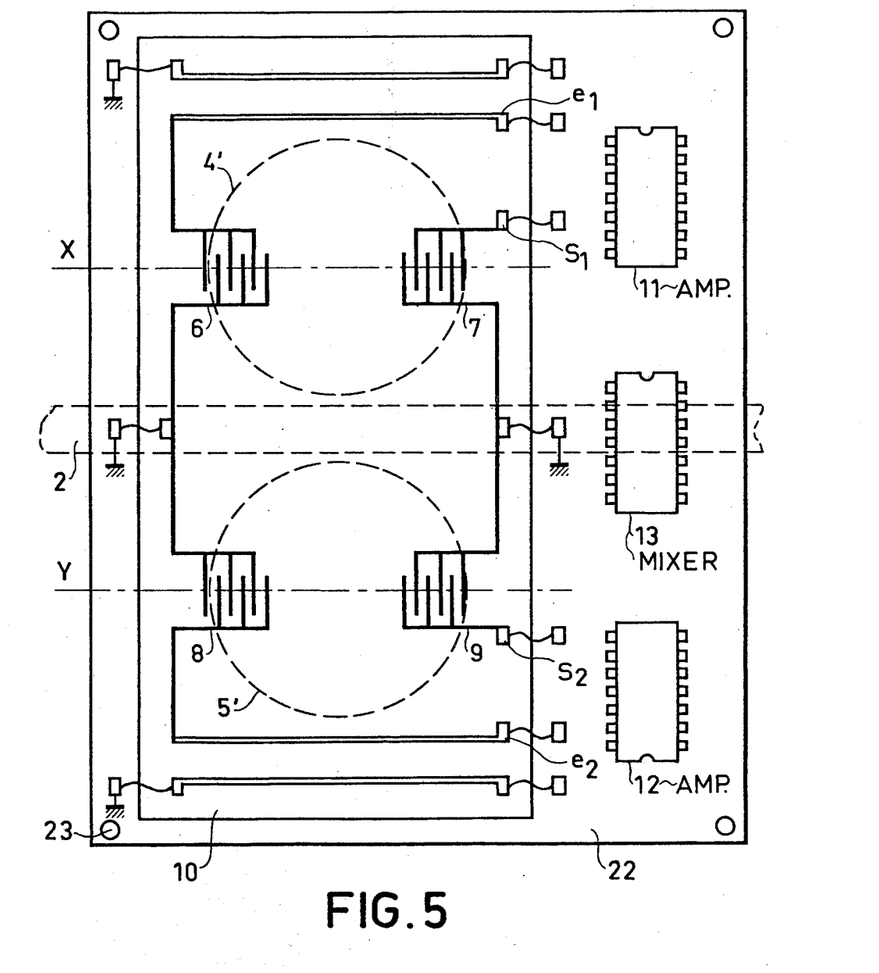

FIG. 5 illustrates a differential pressure sensor according to the present invention incorporating two elastic surface wave oscillators. Each of the oscillators is substantially identical to one of the channels illustrated in FIG. 3. The transducers are deposited on a piezoelectric plate 10 forming a substrate and constitute two delay lines positioned in accordance with parallel axes X and Y. The zones of the plate between on the one hand transducers 6 and 7 and on the other transducers 8 and 9 on the face opposite to that carrying the transducers are respectively exposed to the pressures upstream and downstream of the pressure differential member 2. To this end, the plate can have recesses 4' and 5' of the same diameter as the outlet orifices of conduits 4 and 5 so as to reduce the thickness of the plate in these zones. The plate can be fixed to a printed circuit 22 provided with windows, whose surface area is at least equal to that of recesses 4' and 5'. This printed circuit is fixed to flat 18 by fixing means symbolized by the orifices 23 and serves as a support for electronic modules constituted for example by integrated circuits 11, 12 and 13 like the circuits of FIG. 3. This printed circuit also carries (not shown) electrical connections interconnecting on the one hand the circuits carried by the piezoelectric plate 10 and on the other electronic circuits used for amplification and mixing. The piezoelectric plate can, for example, be of quartz in section ST. As an example, a typical value for an oscillating frequency of each of the oscillators is approximately 100 MHz. It may be preferable at rest, i.e. when the pressures exerted on each of the zones 4' and 5' are equal ($\Delta P = 0$) the beat frequency supplied by mixer 13 differs from 0 and is for example approximately 100 kHZ.

Contrary to the prior art pressure sensors according to the diagram of FIG. 3, each of the channels is an active channel because it is exposed to a pressure to be measured. Thus, in FIG. 3, the delay line incorporating transducers 8 and 9 is only used for compensating parasitic effects. Within the scope of the invention, there is no need to provide a double oscillator for each of the channels. Thus, if the two oscillators incorporating on the one hand transducers 6 and 7 and on the other transducers 8 and 9 are produced by deposition on the same plate, compensations take place on the same way.

Other types of pressure differential members can be used, e.g. nozzles, venturis or any combination thereof. According to the invention, it is preferable to deposit the transducers constituting the delay lines on the same piezoelectric material plate. Thus, it is of interest to select from among these members those which permit closely juxtaposed pressure connections. Besides the annular chamber diaphragm used in the example described with reference to FIGS. 4 and 5, it is possible to use an annular chamber nozzle as illustrated in FIG. 6.

Figure 6:
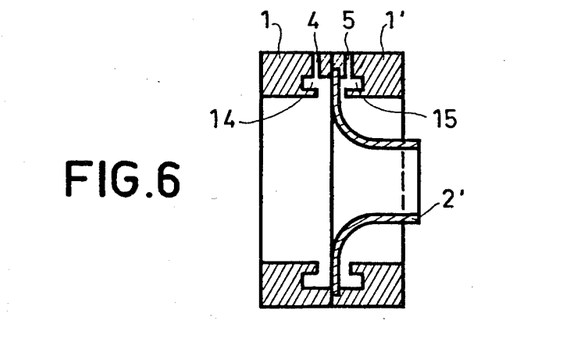
FIG. 6 another type of pressure differential member constituted by a nozzle.

In FIG. 6, nozzle 2' replaces the diaphragm 2 of FIG. 4 and includes a convergent part with a rounded profile extended by a cylindrical neck and mounted between flanges 1 and 1' identical to those used for the annular chamber diaphragms.

The choice of the specific type of pressure differential member is dependent on numerous considerations and in particular those linked with the cost and ease of manufacture on the one hand and the maximum permitted residual pressure head loss on the other, the pressure differential members of the nozzle or venturi type leading to a lower loss.

Figure 7:
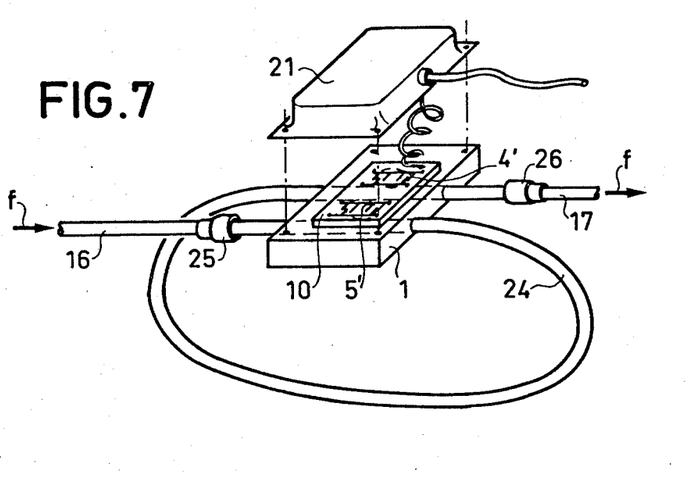
FIGS. 7 and 8 a second embodiment of a flow measuring device according to the invention.
Figure 8:
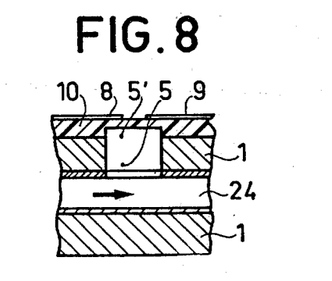

According to a second embodiment, use is made of the loss of pressure head in any pipe and given by the equation $$\omega = \frac{P - P'}{1}$$

in which 1 is the distance traversed by a fluid. FIG. 7 illustrates this embodiment. As hereinbefore, a fluid flows in the direction indicated by arrows f from upstream flow path 16 to downstream flow path 17. A flowmeter according to the second embodiment of the invention is inserted between these two flow paths. The flowmeter includes a body 1 having two ducts in which a supplementary pipe 24 which is wound onto itself is held in the vicinity of its ends and is connected respectively at 25 and 26 to upstream and downstream flow paths 16 and 17. In the vicinity of the ends of this pipe and in the flowmeter body are provided conduits 4 and 5 constituting connections for measuring the pressure in the vicinity of the ends. A piezoelectric plate is positioned on the upper face of the flowmeter body and on the plate are deposited two delay lines identical to those illustrated by FIG. 5. In the useful area of the delay lines are provided recesses 4' and 5' with the same diameter as the outlets of conduits 4 and 5 and positioned with respect to the outlets. FIG. 8 illustrates a section through such an arrangement.

The frequency of the output signals of the oscillators associated respectively with the delay lines incorporating transducers 6 and 7 and 8 and 9 supply signals of frequency $f_1$ and $f_2$ directly proportional to the pressure at the two ends of the supplementary pipe 24. If the length of this pipe is known and equal to 1 and if the nature of the fluid whose volume flow rate is to be measured is also known, the rate can be deduced from the difference $\Delta f$ of the two frequencies $f_1$ and $f_2$.

Figure 10:
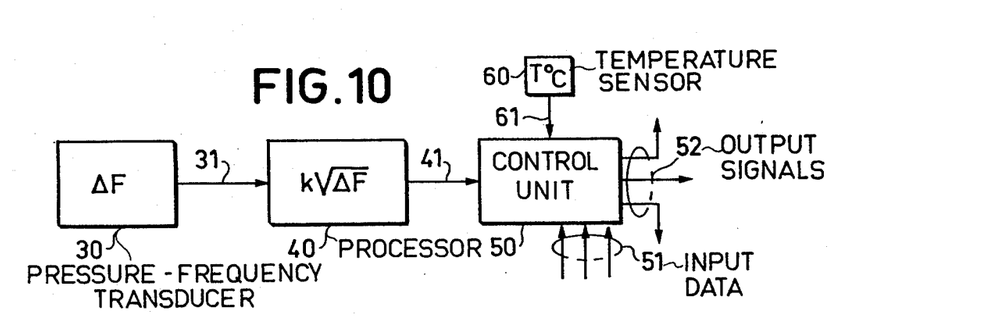
FIG. 10 diagrammatically, a system for regulating the injection of fuel into an internal combustion engine associated with a device according to the invention.

A particularly interesting application of the devices according to the invention will now be described relative to FIG. 10. According to a known process for regulating the injection of fuel into an internal combustion engine, the air flow admitted into the cylinders of the engine must be measured and the indication transmitted to a data processing device combining signals representing, other than the air flow, parameters characteristic of the operation of the engine. In FIG. 10, a circuit 30 constituted by a device according to the invention supplies signals of frequency $\Delta F$, i.e. digital-type signals at its output 31. At this stage, in order to determine the volume flow rate Q, it is possible to use a cabled device 40 to establish a signal, whose frequency is proportional to the square root of the output frequency of mixer 13, this being for the purpose of calculating the equation $Q = k\sqrt{\Delta F}$, i.e. of a value proportional to $\sqrt{\Delta P}$ because the frequency is directly proportional to the differential pressure $\Delta P$. For example, this circuit can utilize pulse counters of the B.R.M. type. The output 41 of this circuit representing the volume flow of air admitted into the cylinders is transmitted to a data processing circuit 50 receiving signals representing other characteristic parameters under the general reference 51 and more particularly the temperature T° C. supplied by a temperature sensor 60 and transmitted by the electrical connection 61. From these various parameters, the data processing circuit 50 processes analog or digital signals 52 which are necessary for regulating the injection of the fuel into the cylinders of the internal combustion engine. The present tendency is to use a microprocessor as the data processing circuit and this same microprocessor can directly perform by program the calculation $\sqrt{\Delta F}$. In this case, circuit 40 is omitted. The microprocessor can also carry out any corrections necessary for the satisfactory operation in order to take account, for example, of temperature or altitude. The mass flow can also be calculated from the volume flow (Q) and the temperature T° C.

Figure 9:
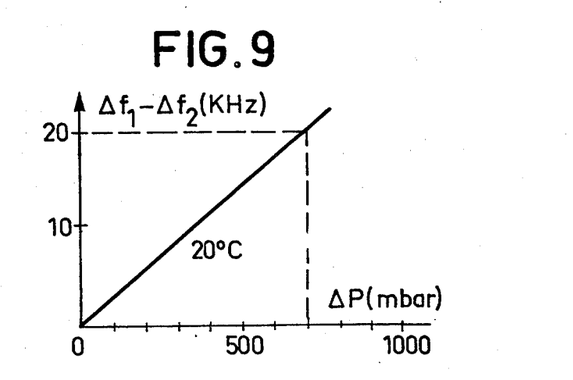
FIG. 9 a diagram showing the relationship between the frequency of the signal supplied by an elastic surface wave oscillator used in the invention and the differential pressure to be measured.

FIG. 9 is a diagram showing the difference in the variations ($\Delta f_1 - \Delta f_2$) of the frequencies of signals supplied by the oscillators in kHz, this being a function of the differential pressure $\Delta P$ to be measured in mbar. Experience has shown that the frequency variation is directly proportional to the differential pressure variation. The curve of FIG. 9 is given for a temperature value equal to 20° C. The slope of the line is 18 KHz/bar. It is possible to detect variations of approximately 6 Hz corresponding to 0.2 mbar. The response time of such a device is particularly fast and in all cases below 1 ms. In the case of an engine with an average cubic capacity the flow rate to be measured varies from approximately 25 to 100 1/s on changing from throttled-down to maximum speed conditions of the engine. As normal atmospheric pressure is conventionally 1013.25 mbar the pressure $P_1$ in the upstream circuit is approximately of this level, with the exception of the losses of pressure head. These considerations make it possible to make the choice of the pressure differential member Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A device for measuring the flow rate of a fluid flowing in a pipe having an upstream portion with an upstream pressure and a downstream portion with a downstream pressure, said device comprising:

a body member connected to said pipe;

means for creating a differential pressure between said upstream pipe portion and said downstream pipe portion disposed within said body member and integral with said body member wherein said body further comprises a flow channel formed within said body member for fluidly communicating said upstream pipe portion with said downstream pipe portion;

first pressure intake means fluidly communicating with said communication channel upstream from said differential pressure means;

second pressure intake means fluidly communicating with said communication channel downstream from said pressure differential means;

a pressure sensor connected to said body member, wherein said pressure sensor further comprises;

a piezoelectric plate in contact with an outer surface portion of said body member and rigidly fixed thereto;

a first active elastic surface wave oscillator disposed on said piezoelectric plate;

a second active elastic surface wave oscillator disposed on said piezoelectric plate proximate to said first elastic surface wave oscillator;

a first amplifier operatively associated with said first oscillator;

a second amplifier operatively associated with said second oscillator;

a first delay line for propagating elastic surface waves operatively associated with said first oscillator;

a second delay line for propagating elastic surface waves operatively associated with said second oscillator;

a first pair of electromechanical split-finger transducers operatively associated with said first oscillator and disposed on a first portion of the outer surface of said piezoelectric plate upstream from said differential pressure means;

a second pair of electromechanical split-finger transducers operatively associated with said second oscillator and disposed upon a second portion of the outer surface of said piezoelectric plate downstream from said differential pressure means;

means for exposing a first inner surface portion of said piezoelectric plate to said first pressure intake means located radially within said first portion of said outer surface of said piezoelectric plate;

means for exposing a second inner surface portion of said piezoelectric plate to said second pressure intake means, said means for exposing said second inner surface portion being disposed radially within said second surface portion of said outer surface of said piezoelectric plate such that changes between said upstream pressure and said downstream pressure modify the propagation time of said elastic surface waves over said first delay line and said second delay line, respectively, and wherein said first and said second elastic surface wave oscillators generate respective first and second signals dependent upon said upstream pressure and said downstream pressure, respectively; and a mixer for receiving said first and second signals and for generating an output beat frequency equal to the difference between said first and second signals.

2. A device according to claim 1 wherein said flow channel further comprises a first internal circular cross section, said upstream portion of said pipe further comprises a second internal circular cross section, and said downstream portion of said pipe further comprise a third internal cross section such that said first, second and third internal circular cross sections are equal in diameter and coaxial.

3. A device according to claim 2 wherein said body member further comprises first and second annular members such that said means for creating a pressure differential is rigidly held by said first and second annular members.

4. A device according to claim 3 wherein said means for creating a pressure differential further comprises a diaphragm.

5. A device according to claim 3 wherein said means for creating a pressure differential further comprises a nozzle converging in a downstream direction and having a rounded profile and a cylindrical neck portion.

6. A device according to claim 3 wherein said first and second annular members each have, respectively, first and second peripheral annular chambers formed therein, such that each of said first and second annular chambers communicates with said fluid flow channel at one end portion of each said first and second annular chambers and with an end surface portion of said annular member at another end portion of each of said first and second annular chambers.

7. A device according to claim 3 wherein said body member further comprises a flat portion provided on the outer surface thereof for receiving said piezoelectric plate and wherein each of said first and second pressure intake means further comprises outlet port means flush with the surface of said flat portion.

8. A device according to claim 1 wherein said means for creating a pressure differential further comprises an auxiliary pipe having a predetermined length and wound so as to form at least one coil such that first and second end portions of said auxiliary pipe are contiguous and have an orifice formed therein fluidly communicating with said means for exposing a first inner surface portion of said piezoelectric plate and with said means for exposing a second inner surface portion of said piezoelectric plate, respectively.

9. A device according to claim 1 for use in an internal combustion engine having cylinders formed therein further comprising:

data processing means operatively associated with said mixer wherein said fluid further comprises air flowing into said cylinders and wherein said data processing means calculates the volume flow rate of said air based on the equation $k=K\sqrt{\Delta P}$ in which Q is the volume flow rate, k is a parameter determined by the dimensions of said device and the nature of said fluid to be measured and P is the differential pressure between said upstream pressure and said downstream pressure which is directly proportional to said output beat frequency.

* * * * *